US010621059B2

(12) United States Patent
Patel et al.

(10) Patent No.: US 10,621,059 B2
(45) Date of Patent: Apr. 14, 2020

(54) SITE RECOVERY SOLUTION IN A MULTI-TIER STORAGE ENVIRONMENT

(71) Applicant: International Business Machines Corporation, Armonk, NY (US)

(72) Inventors: Kushal Patel, Pune (IN); Sarvesh Patel, Pune (IN); Wendy Lyn Henson, Portland, OR (US); Joseph Thie, Bolton, MA (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 15/846,345

(22) Filed: Dec. 19, 2017

(65) Prior Publication Data

US 2019/0188100 A1 Jun. 20, 2019

(51) Int. Cl.
*G06F 11/00* (2006.01)
*G06F 11/20* (2006.01)
*G06F 3/06* (2006.01)

(52) U.S. Cl.
CPC .......... *G06F 11/2094* (2013.01); *G06F 3/065* (2013.01); *G06F 3/067* (2013.01); *G06F 3/0619* (2013.01); *G06F 3/0665* (2013.01); *G06F 2201/805* (2013.01); *G06F 2201/82* (2013.01)

(58) Field of Classification Search
CPC .............. G06F 11/2094; G06F 11/2089; G06F 11/2092; G06F 11/2097; G06F 3/0619; G06F 3/0665; G06F 3/067; G06F 3/0614; G06F 3/0617; G06F 3/0628; G06F 3/629; G06F 3/0631; G06F 3/0634; G06F 3/0635; G06F 3/064; G06F 3/0644; G06F 3/0646; G06F 3/0647; G06F 3/0655; G06F 3/0683; G06F 3/0685; G06F 3/0689; G06F 2201/805; G06F 2201/82; G06F 12/0806; G06F 12/0866
See application file for complete search history.

(56) References Cited

U.S. PATENT DOCUMENTS

| 9,275,063 B1* | 3/2016 | Natanzon | G06F 16/172 |
| 10,176,212 B1* | 1/2019 | Prohofsky | G06F 17/30371 |
| 2005/0256972 A1 | 11/2005 | Cochran et al. | |
| 2014/0207995 A1* | 7/2014 | Benhase | G06F 12/0246 711/102 |

(Continued)

FOREIGN PATENT DOCUMENTS

CN 104506637 A 4/2015

*Primary Examiner* — Anthony J Amoroso
(74) *Attorney, Agent, or Firm* — Jay Wahlquist (57) ABSTRACT

A computer implemented method comprises detecting a failure of a primary volume at a first location, the primary volume having data stored on a first plurality of media according to a first heat map; in response to detecting the failure of the primary volume, overwriting a second heat map of a secondary volume at a second location with a copy of the first heat map, the secondary volume having data stored on a second plurality of media according to the second heat map; migrating extents of data on the second plurality of media at the second location according to the copy of the first heat map prior to a next heat map cycle update after detection of the failure; and processing data access requests from the secondary location using the extents of data on the secondary plurality of media migrated according to the copy of the first heat map.

20 Claims, 5 Drawing Sheets

(56) References Cited

U.S. PATENT DOCUMENTS

| | | | |
|---|---|---|---|
| 2014/0208017 A1* | 7/2014 | Benhase | G06F 3/0647 |
| | | | 711/119 |
| 2014/0208018 A1* | 7/2014 | Benhase | G06F 12/0866 |
| | | | 711/113 |
| 2015/0095282 A1* | 4/2015 | Jones | H04L 67/1008 |
| | | | 707/624 |
| 2015/0277762 A1* | 10/2015 | Guo | G06F 3/061 |
| | | | 711/154 |
| 2015/0286413 A1* | 10/2015 | Olson | G06F 16/119 |
| | | | 711/103 |
| 2015/0355837 A1* | 12/2015 | Bish | G06F 3/061 |
| | | | 711/114 |
| 2016/0048340 A1 | 2/2016 | Jennas, II et al. | |
| 2016/0212203 A1* | 7/2016 | Jones | H04L 67/1008 |
| 2017/0139792 A1* | 5/2017 | Gupta | G06F 11/2094 |
| 2017/0161286 A1* | 6/2017 | Eda | G06F 3/0647 |

* cited by examiner

SITE RECOVERY SOLUTION IN A MULTI-TIER STORAGE ENVIRONMENT

BACKGROUND

Storage networks, such as storage area networks (SANs), are used to interconnect different types of data storage systems with different types of servers (also referred to herein as "host systems"). Some servers involve various hardware such as data storage media, storage controllers, memories, and the accompanying power systems, cooling systems, etc.

Storage controllers control access to data storage media and memories in response to read and write requests. The storage controllers may direct the data in accordance with data storage devices such as RAID (redundant array of independent disks), JBOD (just a bunch of disks), and other redundancy and security levels. As an example, an IBM® ESS (Enterprise Storage Server) such as a DS8000 series has redundant clusters of computer entities, cache, non-volatile storage, etc.

SUMMARY

Aspects of the disclosure may include a computer implemented method, computer program product, and system. The computer implemented method comprises detecting a failure of a primary volume at a first location, the primary volume having data stored on a first plurality of media according to a first heat map; in response to detecting the failure of the primary volume, overwriting a second heat map of a secondary volume at a second location with a copy of the first heat map, the secondary volume having data stored on a second plurality of media according to the second heat map; migrating extents of data on the second plurality of media at the second location according to the copy of the first heat map prior to a next heat map cycle update after detection of the failure; and processing data access requests from the secondary location using the extents of data on the secondary plurality of media migrated according to the copy of the first heat map The above summary is not intended to describe each illustrated embodiment or every implementation of the present disclosure.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably. The term "automatic" and variations thereof, as used herein, refers to any process or operation done without material human input when the process or operation is performed. Human input is deemed to be material if such input directs or controls how or when the process or operation is performed. A process which uses human input is still deemed automatic if the input does not direct or control how or when the process is executed.

The terms "determine", "calculate" and "compute," and variations thereof, as used herein, are used interchangeably and include any type of methodology, process, mathematical operation or technique. Hereinafter, "in communication" or "communicatively coupled" shall mean any electrical connection, whether wireless or wired, that allows two or more systems, components, modules, devices, etc. to exchange data, signals, or other information using any protocol or format. Furthermore, two components that are communicatively coupled need not be directly coupled to one another, but can also be coupled together via other intermediate components or devices.

Figure 1:
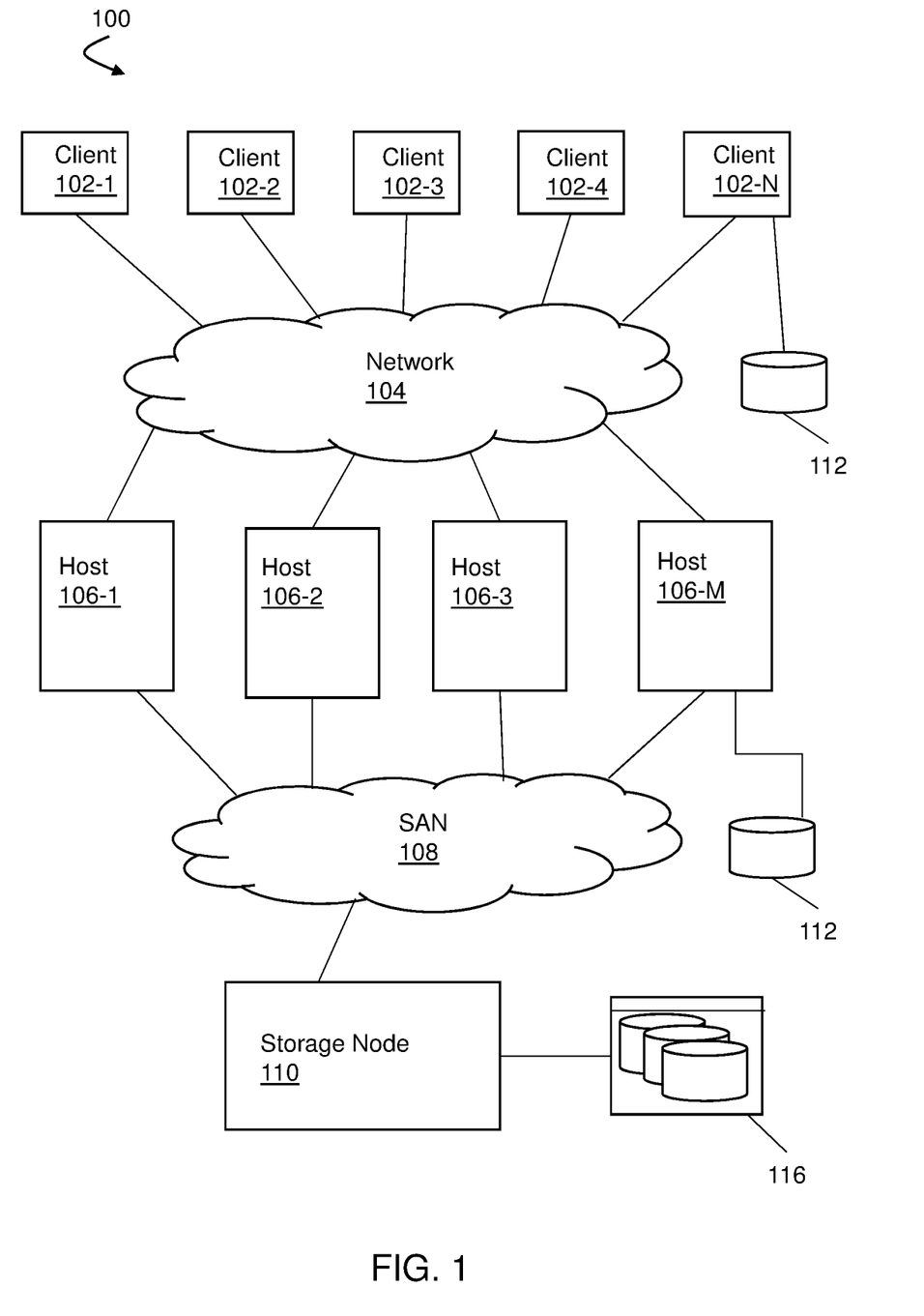
FIG. 1 is a high-level block diagram depicting one embodiment of an example network environment.

FIG. 1 is a high-level block diagram depicting one embodiment of an example network architecture 100. The network architecture 100 is presented only by way of example and not limitation. Indeed, the systems and methods disclosed herein may be applicable to a wide variety of different network architectures in addition to the network architecture 100 shown in FIG. 1.

As shown, the network architecture 100 includes one or more clients or client computers 102-1 . . . 102-N, where N is the total number of client computers, and one or more hosts 106-1 . . . 106-M, where M is the total number of hosts (also referred to herein as "server computers" 106, "host systems" 106, or "host devices" 106). It is to be understood that although five clients 102 are shown in FIG. 1, other numbers of clients 102 can be used in other embodiments. For example, in some embodiments only one client 102 is implemented. In other embodiments, more than five or fewer than 5 clients 102 are used. Similarly, it is to be understood that although four hosts 106 are shown in FIG. 1, any suitable number of hosts 106 can be used. For example, in some embodiments, only a single host 106 is used. In other embodiments, more than four or fewer than four storage hosts 106 can be used.

Each of the client computers 102 can be implemented as a desktop computer, portable computer, laptop or notebook computer, netbook, tablet computer, pocket computer, smart phone, or any other suitable type of electronic device. Similarly, each of the hosts 106 can be implemented using any suitable host computer or server. Such servers can include, but are not limited to, IBM System z® and IBM System i® servers, as well as UNIX servers, Microsoft Windows servers, and Linux platforms.

The client computers 102 are communicatively coupled to hosts 106 via a network 104. The network 104 may include, for example, a local-area-network (LAN), a wide-area-network (WAN), the Internet, an intranet, or the like. In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100, in the example embodiment of FIG. 1, includes a storage network 108 behind the servers 106. For example, the storage network 108 can be, in some embodiments, a storage-area-network (SAN), as depicted in FIG. 1. In other embodiments, the storage network 108 can be implemented as a LAN (e.g., when using network-attached storage). In the example shown in FIG. 1, the network 108 connects the servers 106 to one or more storage nodes 110, such as a SAN Volume Controller (SVC) node. Although only one storage node 110 is shown for purposes of illustration, it is to be understood that more than one storage node 110 can be used in other embodiments. The storage node 110 manages connections to arrays of storage devices 116. The arrays of storage devices 116 can include arrays of hard-disk drives and/or solid-state drives.

In addition, in conventional systems, cold data (e.g. data which is not accessed frequently) can be placed on relatively slower storage media (e.g. spinning disks) with data accessed more frequently located on faster media (e.g. solid state disks). To access a storage node 110, a host system 106 may communicate over physical connections from one or more ports on the host 106 to one or more ports on the storage node 110. A connection may be through a switch, fabric, direct connection, or the like. In certain embodiments, the servers 106 and storage node 110 may communicate using a networking standard such as Fibre Channel (FC) or iSCSI.

Figure 2:
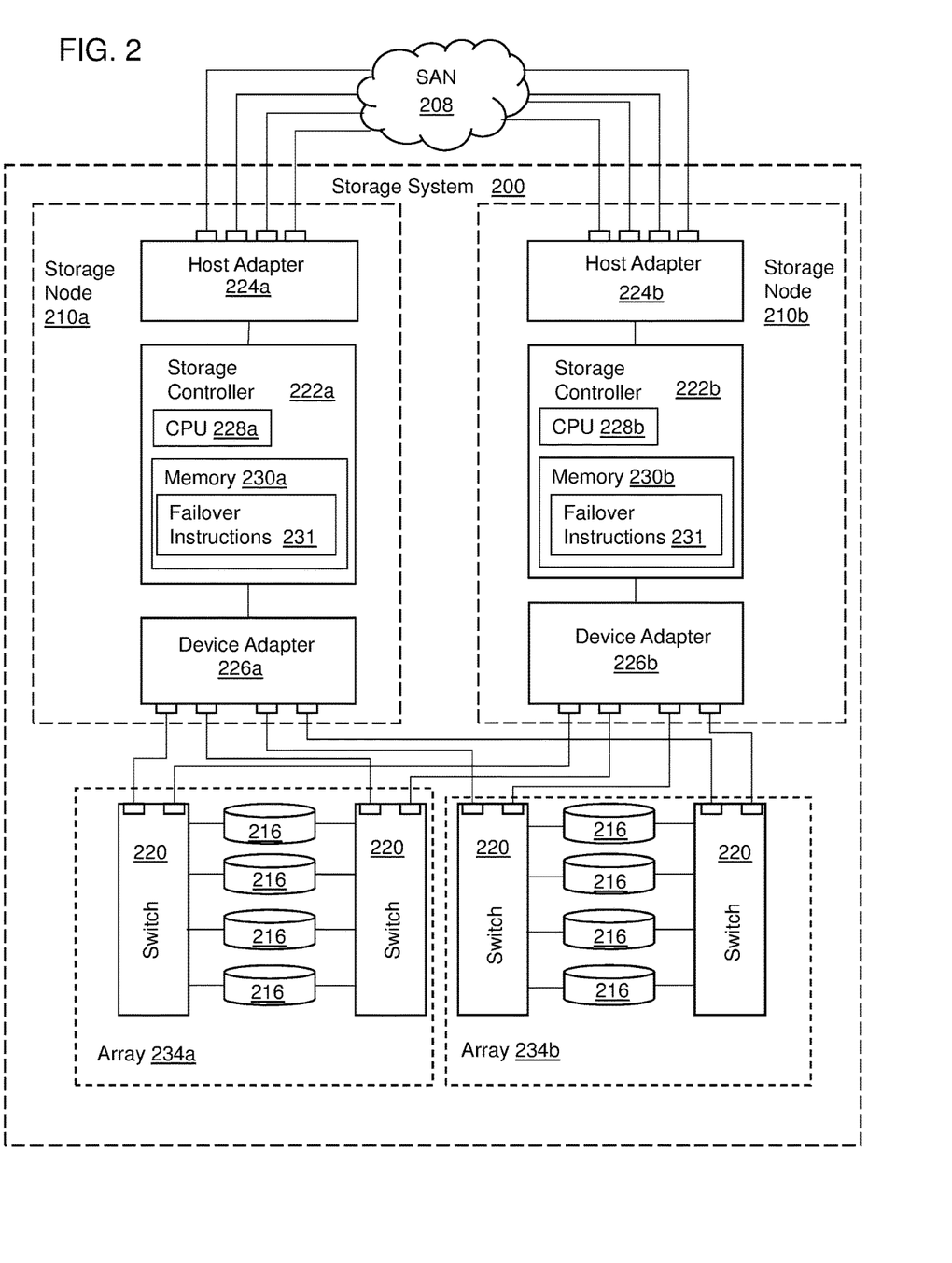
FIG. 2 is a high-level block diagram depicting one embodiment of an example storage system.

FIG. 2 is a high-level block diagram of one embodiment of a storage system 200. Storage system 200 includes one or more arrays of storage drives (e.g., hard-disk drives and/or solid-state drives). As shown, the storage system 200 includes a first storage node 210a, a second storage node 210b, a plurality of switches 220, and a plurality of storage drives 216 such as hard disk drives and/or solid-state drives (such as flash-memory-based drives). Each storage node 210 enables one or more hosts (e.g., open system and/or mainframe servers) to access data in the plurality of storage drives 216.

In some embodiments, each storage node 210 includes one or more respective storage controllers 222. In the example shown in FIG. 2, the storage node 210a includes storage controller 222a and storage node 210b includes storage controller 222b. Although only two storage controllers 222 are shown herein for purposes of explanation, it is to be understood that more than two storage controllers can be used in other embodiments. Similarly, although only two storage nodes 210 are shown herein for purposes of explanation, it is to be understood that more than two storage nodes can be used in other embodiments. Each storage node 210 in FIG. 2 also includes respective host adapters 224a, 224b and respective device adapters 226a, 226b to connect the storage nodes 210 to host devices and storage drives 216, respectively. Multiple storage controllers 222a, 222b provide redundancy to help ensure that data is available to connected hosts. Thus, when one storage controller (e.g. storage controller 222a) fails, the other storage controller (e.g. 222b) can pick up the I/O load of the failed storage controller to ensure that I/O is able to continue between the hosts and the storage drives 216. This process can be referred to as a "failover." For example, storage node 210a can be physically located in a separate location from storage node 210b such that environmental conditions around the area of storage node 210a which might cause a failure of storage node 210a do not affect storage node 210b. Additionally, storage node 210a and array 234a are co-located while storage node 210b and array 234b are co-located. In this example, storage node 210a and array 234a are configured to act as a primary volume. That is, client requested to read and write data are served by the primary volume while the secondary volume, storage node 210b and array 234b, maintains a backup of the data in the primary volume. As described in more detail below, the storage controllers 222 are configured to improve performance of processing I/O requests after a failover from the primary volume to the secondary volume, for example.

Each storage controller 222 can include respective one or more processors 228 and memory 230. The memory 230 can include volatile memory (e.g., RAM) as well as non-volatile memory (e.g., ROM, EPROM, EEPROM, flash memory, etc.). The volatile and non-volatile memory can store software modules that run on the processor(s) 228 and are used to access data in the storage drives 216. The storage controllers 222 can host at least one instance of these software modules. These software modules can manage all read and write requests to logical volumes in the storage drives 216. In particular, the memory 230, in this example, stores failover instructions 231 which are configured to enable more efficient access to frequently accessed data after a failover operation, as described in more detail below.

Each storage controller 222 is communicatively coupled to the storage drives 216 via a respective device adapter 226. Each device adapter 226 is configured to manage Input/Output (I/O) accesses (also referred to herein as data access requests or access requests) to the storage drives 216. For example, the device adapters 226 logically organize the storage drives 216 and determine where to store data on the storage drives 216. The storage drives 216 (also referred to as disk drive modules (DDM)) can include groups of different types of drives having different performance characteristics. For example, the storage drives 216 can include a combination of (relatively) slow 'nearline' disks (e.g. 7,200 revolutions per minute (RPM) rotational speed), SAS disk drives (e.g. 10 k or 15 k RPM) and/or relatively fast solid state drives (SSD).

The device adapters 226 are coupled to the storage drives 216 via switches 220. Each of the switches 220 can be fiber switches coupling the storage drives 216 to the device adapters via fiber optic connections. The device adapters 226 logically group the storage drives 216 into array sites 234. For purposes of illustration, a single respective array site 234 comprised of respective storage drives 216 is depicted in FIG. 2 as being coupled to each of storage node 210a and storage node 210b. However, it is to be understood that more than one array site comprised of storage drives 216 can be included in other embodiments for each volume. Each array site 234 can be formatted as a Redundant Array of Independent Disks (RAID) array. It is to be understood that any type of RAID array (e.g. RAID 0, RAID 5, RAID 10, etc.) can be used. Each RAID array is also referred to as a rank. Each rank is divided into a number of equally sized partitions referred to as extents. The size of each extent can vary based on the implementation. For example, the size of each extent can depend, at least in part, on the extent storage type. The extent storage type (e.g. Fixed Block (FB) or count key data (CKD)) is dependent on the type of host coupled to the storage sub-system (e.g. open-systems host or mainframe server). The extents are then grouped to make up logical volumes (e.g. the primary and secondary volumes).

The storage sub-system 210 can enable various management features and functions, such as, but not limited to, full disk encryption, non-volatile storage (NVS) algorithms (e.g. thresholding, stage, destage), storage pool striping (rotate extents), dynamic volume expansion, dynamic data relocation, intelligent write caching, and adaptive multi-stream prefetching. One example of a storage system 210 having an architecture similar to that illustrated in FIG. 2 is the IBM DS8000™ series enterprise storage system. The DS8000™ is a high-performance, high-capacity storage sub-system providing disk and solid-state storage that is designed to support continuous operations. Nevertheless, the embodiments disclosed herein are not limited to the IBM DS8000™ series enterprise storage system, but can be implemented in any comparable or analogous storage system or group of storage systems, regardless of the manufacturer, product name, or components or component names associated with the system. Thus, the IBM DS8000™ is presented only by way of example and is not intended to be limiting.

The storage nodes 210 are configured to monitor data accesses to data on the plurality of storage devices of one or more RAID arrays (e.g. array 234) in the storage system. Based on the monitored accesses, the storage nodes 210 can identify two or more categories of data. In this example, for purposes of explanation, only two categories of data are used, referred to herein as hot data and cold data. The hot data category corresponds to data which is accessed (e.g. read and/or write I/O requests) frequently. For example, data which has data accesses within a first time period can be considered hot data. In some embodiments, the predetermined amount of time for the first time period is a specified number of weeks. In other embodiments, the predetermined amount of time is a specified number of days. In other embodiments, other amounts of time are used. Alternatively, data which has more than a threshold number of data accesses within a given time period (e.g. weeks, days, hours, etc.) can be considered hot data in other embodiments. The cold data category corresponds to data which is not accessed frequently. For example, data which has not had a data access within the first time period can be considered cold data in some embodiments. Alternatively, data which has had less than the threshold number of data accesses within the given time period can be considered cold data in other embodiments.

As discussed above, the storage drives 216 can include different types of storage media having different performance characteristics such as relatively slow hard disk drives (HDD) (e.g. 7,200 revolutions per minute (RPM) rotational speed) and relatively fast solid state drives. Based on the monitored I/O accesses, the storage nodes 210 are configured to place data on corresponding media drives. For example, data that is frequently accessed by an application that is response time sensitive might be stored on relatively faster media, such as solid state drives (SSD). Other data that is infrequently accessed and for which a higher response time is more tolerable might be stored on relatively slower media, such as high capacity 7.2K RPM drives. Such an arrangement is referred to herein as multi-tiered storage. In the above example, the faster SSD are associated with a first tier and the slower HDD are associated with a slow tier.

The cost per Gigabyte of storage is typically higher for faster media, such as SSDs, than it is for the slower media, such as 7.2K RPM drives. One challenge in effectively using multi-tiered storage is identifying the data that benefits from the higher cost/higher performance storage tiers. Over time, the optimal tier for a given piece of data may change. Thus, the identification and movement of data to the appropriate tier is an on-going process. The storage nodes 210 are configured to monitor the storage workload and automate the placement of data amongst different storage tiers in order to improve performance. Thus, the storage nodes 210 enable the dynamic relocation of data across tiers based on the data usage by placing "hot" data with high IO density and low response time requirements on faster/costlier media, such as Solid State Drives, while targeting slower/cheaper media, such as hard disk drives (HDDs), for "cooler" data that is accessed more sequentially and/or at lower rates. One such technology which can automate the dynamic relocation of data across tiers is IBM's Easy Tier® family of technologies.

Figure 3:
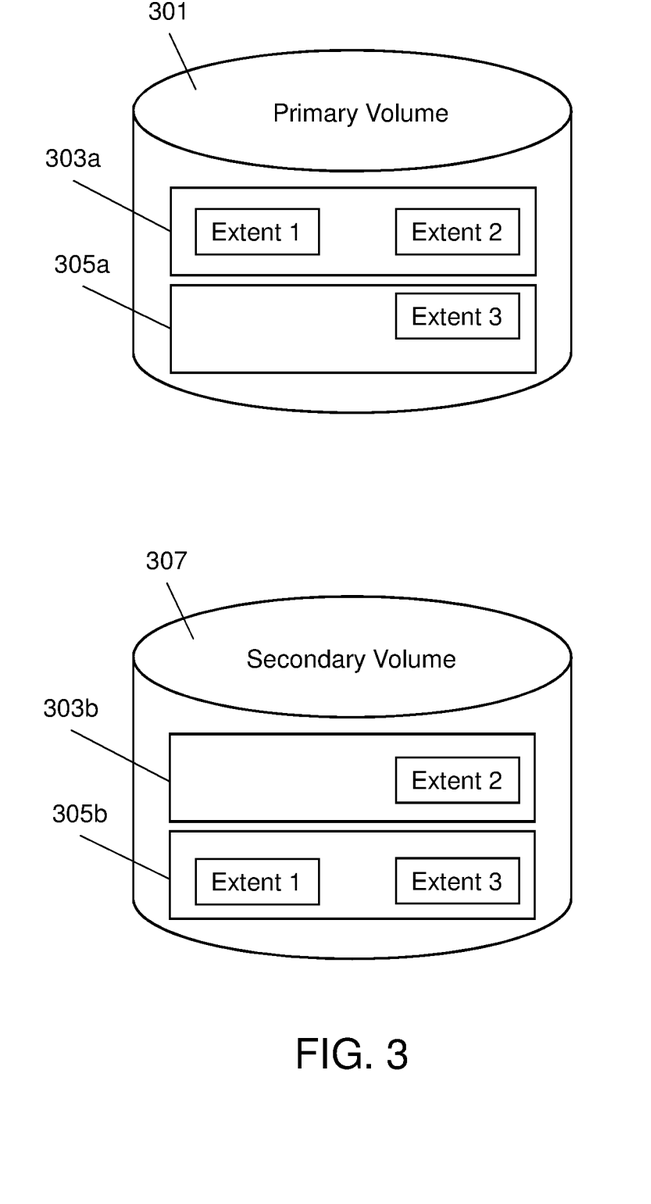
FIG. 3 is a high-level block diagram depicting one embodiment of example primary and secondary volumes of a multi-tier storage system.

FIG. 3 depicts an example of the dynamic allocation of data to different tiers. In the example of FIG. 3, the primary volume 301 (e.g. storage node 210a and array 234a) includes a first tier 303a and a second tier 305a. Similarly, the secondary volume 307 includes a first tier 303b and a second tier 305b. The first tier 303a/303b is used to store frequently accessed or "hot" data and the second tier 305a/305b is used to store infrequently accessed or "cold" data, as discussed above. The secondary volume 307 is in sync with the primary volume 301. For example, the primary volume 301 serves Read/Write IO and sends only Write IO to the secondary volume 307 to make the secondary volume 307 consistent with the data in the primary volume 301. The identification of data as hot or cold is stored in a respective heat map in the primary volume 301 and the secondary volume 307. As used herein a heat map refers to a mapping of data to a tier of storage based on access requests (e.g. READ and WRITE IO) for the respective data. As all READ/WRITE IOs are served by primary volume 301, the heat map of the primary volume 301 is correct and tiering migrations are done as per application IO workload. However, as the secondary volume 307 is a backup of the primary volume 301, the secondary volume 307 only receives WRITE workload coming from the primary volume 301. Therefore, the heat map of the secondary volume 307 only reflects the heat (e.g. access frequency) of WRITE operations done by applications.

Due to this, the heat maps of primary volume 301 and secondary volume 307 are different. For example, in the embodiment of FIG. 3, extent 2 has a large WRITE IO, so the tiering process in both the primary volume 301 and the secondary volume 307 is identified as hot and placed in the fast tier 303 in both the primary volume 301 and the secondary volume 307. Similarly, extent 3 has a relatively low WRITE and READ IO, so the tiering process in both the primary volume 301 and the secondary volume 307 is identified as cold and placed in the slow tier 305 in both the primary volume 301 and the secondary volume 307. However, extent 1 has a large READ IO, so the tiering process in the primary volume 301 identifies extent 1 as hot and places it in the fast tier 303 which gives performance benefits for a client program while accessing extent 1. However, since the secondary volume does not receive the READ IO, the tiering process in the secondary volume 307 identifies the extent 1 as cold and places it on the slower tier 305.

In case of a failover scenario of the primary volume 301 (e.g. loss of power or network connectivity), the secondary volume 307 at the failover site starts serving application IO access requests. However, in a conventional system, as discussed above, the heat map at a secondary volume in conventional systems, does not accurately reflect "hot" data due to READ operations. As such, the application READ operations will observe high latency after site failover in conventional systems. In other words, in a conventional system, the data which was READ hot and moved to a faster tier (e.g. SSD) at the primary volume is located at a slower tier at failover site because no READ IOs are reflected to this secondary volume.

In particular, as shown in the example FIG. 3, in a conventional system after a failover, user programs accessing extent 1 start getting performance degradation since extent 1 is stored on the slower tier at the secondary volume. This results in unexpected consequences in the user program behavior due to the failover to secondary volume in conventional systems. In particular, the user programs will suffer higher latency until the data is migrated to the upper tier after at least one cycle of extent migration.

Embodiments of the enhanced system described herein, however, provide efficient data management of high performance tiers in multi-tier architecture by making the enhanced system aware of the heat map during site recovery/failover operation. For example, the tiering mechanism at the storage controller in both the primary volume 301 and the secondary volume 307 has the heat map associated with each volume copy. At the time of failover of primary volume 301, a host starts using the secondary volume 307 to access the data. During the failover operation, the storage node of the secondary volume 307 (e.g. storage node 210b) is configured to replace the heat map of the secondary volume 307 with the heat map of the primary volume 301. Once the heat map is replaced, the tiering process immediately executes the tiering algorithm with the changed heat map. This uplifts the extents in the secondary volume which are hot due to READ operation. As the heat map is copied from the primary volume, the respective extents will be moved to the same tier in the secondary volume 307 as in the primary volume 301. This extent movement at the time of failover helps improve host IO performance and gives performance benefits at the time of site failure and recovery as compared to conventional systems.

Figure 4:
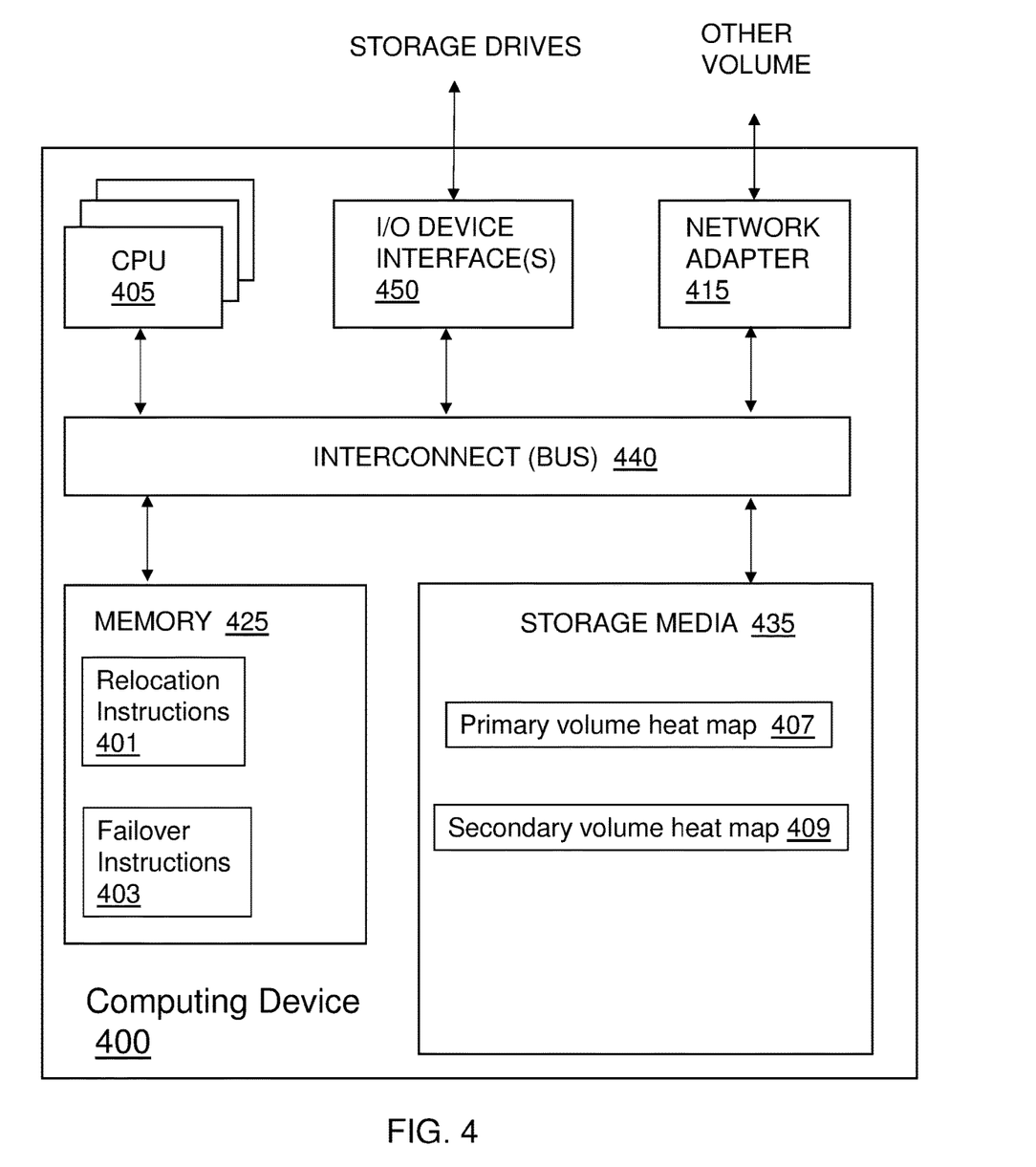
FIG. 4 is a block diagram of one embodiment of an example storage controller.

FIG. 4 is a block diagram of one embodiment of an example computing device 400 which can be implemented as a storage controller, such as storage controllers 222. In the example shown in FIG. 4, the storage controller 400 includes a memory 425, storage 435, an interconnect (e.g., BUS) 440, one or more processors 405 (also referred to as CPU 405 herein), an I/O device interface 450, and a network adapter or port 415.

Each CPU 405 retrieves and executes programming instructions stored in the memory 425 and/or storage 435. The interconnect 440 is used to move data, such as programming instructions, between the CPU 405, I/O device interface 450, storage 435, network adapter 415, and memory 425. The interconnect 440 can be implemented using one or more busses. The CPUs 405 can be a single CPU, multiple CPUs, or a single CPU having multiple processing cores in various embodiments. In some embodiments, a processor 405 can be a digital signal processor (DSP). Memory 425 is generally included to be representative of a random access memory (e.g., static random access memory (SRAM), dynamic random access memory (DRAM), or Flash). The storage 435 is generally included to be representative of a non-volatile memory, such as a hard disk drive, solid state device (SSD), removable memory cards, optical storage, or flash memory devices.

In some embodiments, the memory 425 stores relocation instructions 401 and failover instructions 403. The storage 435 stores primary volume heat map 407 and secondary volume heat map 409. However, in various embodiments, the relocation instructions 401, failover instructions 403, primary volume heat map 407, and secondary volume heat map 409 are stored partially in memory 425 and partially in storage 435, or they are stored entirely in memory 425 or entirely in storage 435 or they are accessed over a network via the network interface 415.

When executed by the CPU 405, the relocation instructions 401 cause the CPU 405 to dynamically relocate data among different storage tiers based on IO accesses, as discussed above. In particular, the primary volume updates the primary volume heat map 407 based on READ and WRITE IO accesses and moves data among storage tiers accordingly, as discussed above. The secondary volume moves data based on the secondary volume heat map 409. As discussed above, the secondary volume heat map 409 does not accurately reflect IO READ operations at the primary volume. During a failover from a primary volume to a backup secondary volume, the failover instructions 403 at the secondary volume cause the secondary volume to replace the secondary volume heat map 409 with the primary volume heat map 407 and to move data among tiers accordingly during the failover operation, as discussed in more detail below with respect to FIG. 5.

Figure 5:
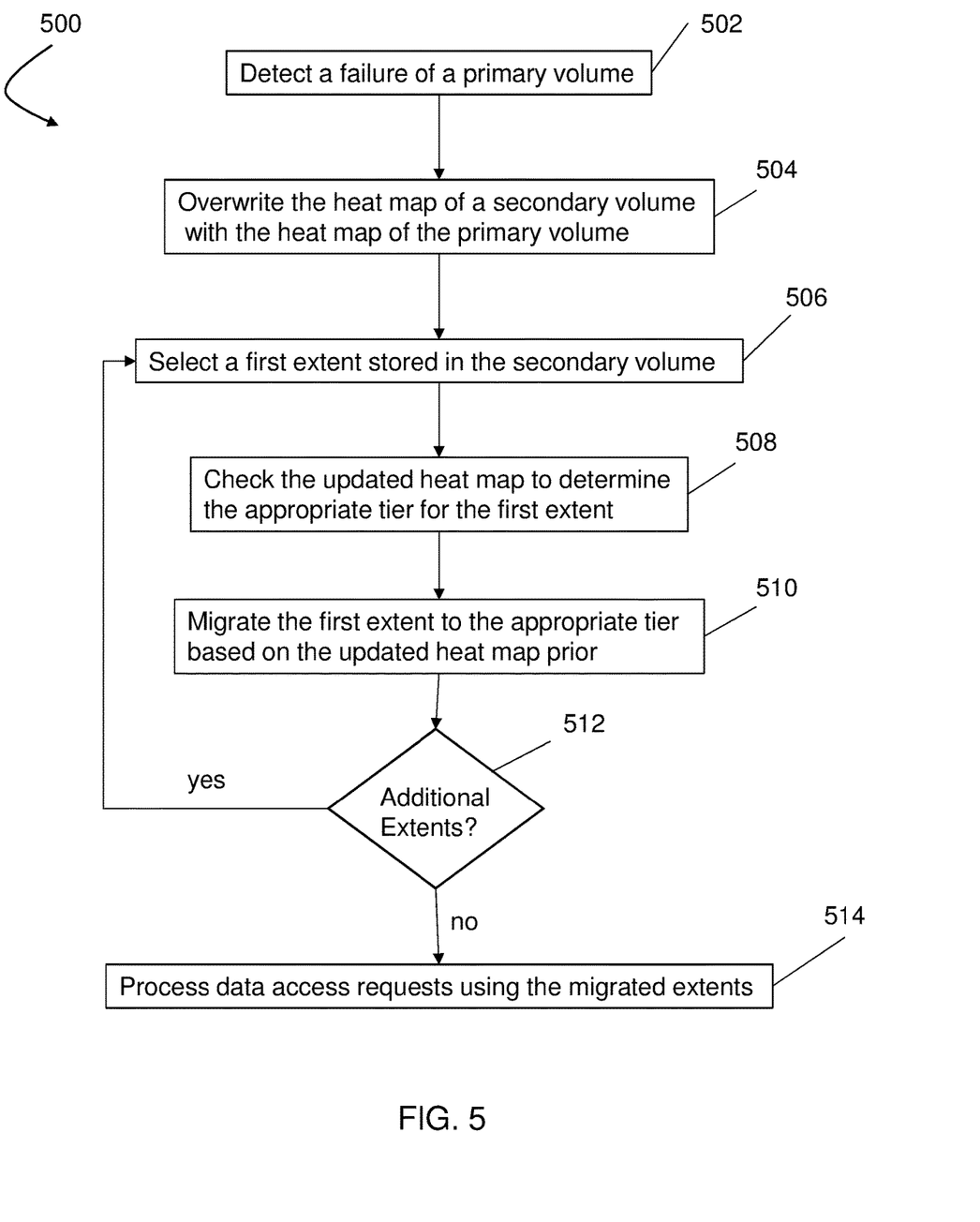
FIG. 5 is a flow chart depicting one embodiment of an example method of failover operation in a multi-tier storage environment.

FIG. 5 depicts a flow diagram of one embodiment of an example method 500 of data relocation for a site failure and recovery scenario. The method 500 can be implemented by a storage controller, such as storage controllers 222. For example, the method 500 can be implemented by a CPU, such as CPU 405 in computing device 400, executing instructions, such as failover instructions 403. It is to be understood that the order of actions in example method 500 is provided for purposes of explanation and that the method can be performed in a different order in other embodiments. Similarly, it is to be understood that some actions can be omitted or additional actions can be included in other embodiments.

At block 502, a failure of a primary volume is detected which indicates a failover operation is to be performed. For example, it can be determined that power at a primary volume has been lost or network connectivity via the SAN has been lost at the primary volume. This can occur due to a natural disaster, malicious hacking attacks, component failure, etc. At block 504, if it is determined that a failover operation is to be performed, the heat map of a secondary volume is invalidated and overwritten with the heat map of a primary volume. For example a copy of the primary volume heat map can be stored in memory of the storage controller at the secondary volume, in some embodiments. In other embodiments, the heat map from the primary volume is made available to the secondary volume during the failover operation via a network. In other words, a copy of the heat map can be stored remotely from the secondary location and accessed as needed after detecting a failure of the primary volume.

At block 506, the storage controller in the secondary volume selects a first extent stored in the secondary volume. In some embodiments, the storage controller selects the first extent randomly. In other embodiments, the storage controller selects an extent stored in a slow tier in the secondary volume first before selecting extents stored in the secondary volume in a fast tier.

At block 508, the storage controller in the secondary volume checks the updated heat map to determine the appropriate tier for the first extent. That is, the current tier of the first extent at the secondary volume prior to detecting the failure of the primary volume is compared to a tier indicated for the first extent in the copy of the first heat map. If the current tier is different than the tier indicated by the copy of the first heat map, then it is determined that the first extent should be migrated. At block 510, the storage controller migrates the first extent to the appropriate tier based on the updated heat map prior to a next heat map cycle update. For example, if the first extent is currently stored in a slow tier and the updated heat map indicates that the first extent should be stored in a slow tier, then migrating the data in such scenarios includes leaving the first extent on the current tier. Additionally, if the first extent is currently stored in a slow tier and the updated heat map indicates that the first extent should be stored in a fast tier, then migrating the data in such scenarios includes moving the first extent to a fast tier. Additionally, in some embodiments, if the first extent is currently stored in a fast tier and the updated heat map indicates that the first extent should be stored in a slow tier, then migrating the data in such scenarios includes moving the first extent to a slow tier.

At block 512, the storage controller determines if there are additional extents to be processed. If there are additional extents to be processed, then method 500 returns to block 506 select another extent until all extents have been processed. In some embodiments, only extents identified as being "cold" or currently stored in a slow tier at the secondary volume prior to detecting the failure of the primary volume are evaluated to determine if a change has occurred due to updating the heat map at block 504. It is to be understood that blocks 506-512 are performed after detecting the failure of the primary volume and before a next heat map cycle update. For example, a heat map can be configured to be updated a periodic intervals based on the data access rate between the periodic intervals. Such periodic intervals can be configured as minutes, hours, or days. However, the method 500 implements the update prior to such scheduled heat map cycle updates to enable improved performance based on the heat map from the primary volume.

At block 514, data access requests are processed from the secondary location using the extents of data migrated at the secondary volume according to the copy of the first heat map. It is to be understood that data access requests can be processed from the secondary location in parallel with migrating data according to the copy of the first heat map. However, after migrating the data, By performing method 500 at the time of the failover operation, performance benefits are achieved by moving extents at the secondary volume based on IO accesses at the primary volume. For example, latency is not increased due to the failover operation as in conventional systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLE EMBODIMENTS

Example 1 includes a computer-implemented method. The method comprises detecting a failure of a primary volume at a first location, the primary volume having data stored on a first plurality of media according to a first heat map; in response to detecting the failure of the primary volume, overwriting a second heat map of a secondary volume at a second location with a copy of the first heat map, the secondary volume having data stored on a second plurality of media according to the second heat map; migrating extents of data on the second plurality of media at the second location according to the copy of the first heat map prior to a next heat map cycle update after detection of the failure; and processing data access requests from the secondary location using the extents of data on the secondary plurality of media migrated according to the copy of the first heat map.

Example 2 includes the computer-implemented method of example 1, wherein the first plurality of media includes one or more first storage drives of a first media type and one or more second storage drives of a second media type; wherein the second plurality of media includes one or more third storage drives of the first media type and one or more fourth storage drives of the second media type; wherein the first media type is relatively slower compared to the second media type.

Example 3 includes the computer-implemented method of example 2, wherein the first media type is a hard disk drive having a rotational speed of 7,2000 revolutions per minute (RPM) and the second media type is a solid state drive.

Example 4 includes the computer-implemented method of any of examples 1-3, wherein migrating the data on the second plurality of media at the second location comprises comparing a respective current tier for at least one extent of data stored on the second plurality of media of the secondary volume with a respective tier for the at least one extent of data indicated by the copy of the first heat map; in response to determining that the respective current tier is different than the respective tier indicated by the copy of the first heat map, moving the at least one extent of data to the respective tier indicated by the copy of the first heat map prior to the next heat map cycle update.

Example 5 includes the computer-implemented method of example 4, wherein the at least one extent of data includes only extents of data stored on a first tier of the secondary volume prior to detecting the failure of the primary volume, the first tier being associated with a first media type that is slower than a second media type.

Example 6 includes the computer-implemented method of any of examples 1-5, further comprising storing both the copy of the first heat map and the second heat map at the second location prior to detecting the failure of the primary volume.

Example 7 includes the computer-implemented method of any of examples 1-6, further comprising retrieving the copy of the first heap map over a network after detecting failure of the primary volume.

Example 8 includes a storage system. The storage system comprises a host adapter having one or more ports configured to communicatively couple the host adapter to one or more host devices; a storage controller comprising a processor and a memory, the storage controller communicatively coupled to the host adapter; and a device adapter comprising a processor and a memory, the device adapter communicatively coupled to the storage controller; wherein the device adapter further comprises a plurality of ports communicatively coupled to a plurality of storage drives grouped to form a plurality of storage tiers. The storage controller is configured to, in response to detecting a failure of a primary volume physically located separate from the storage controller, overwrite a secondary heat map stored in the memory of the secondary controller with a copy of a first heat map utilized at the primary volume; migrate extents of data to one or more of the plurality of storage tiers according to the copy of the first heat map; and process data access requests using the extents of data migrated to the one or more of the plurality of storage tiers according to the copy of the first heat map.

Example 9 includes the storage system of example 8, wherein the plurality of storage drives includes one or more first storage drives of a first media type and one or more second storage drives of a second media type; wherein the first media type is relatively slower compared to the second media type.

Example 10 includes the storage system of example 9, wherein the first media type is a hard disk drive having a rotational speed of 7,2000 revolutions per minute (RPM) and the second media type is a solid state drive.

Example 11 includes the storage system of any of examples 8-10, wherein the storage controller is configured to migrate the extents of data to one or more of the plurality of storage tiers by: comparing a respective current tier for at least one extent of data stored on the plurality of storage drives with a respective tier for the at least one extent of data indicated by the copy of the first heat map; and in response to determining that the respective current tier is different than the respective tier indicated by the copy of the first heat map, moving the at least one extent of data to the respective tier indicated by the copy of the first heat map prior to a next heat map cycle update.

Example 12 includes the storage system of example 11, wherein the at least one extent of data includes only extents of data stored on a first tier prior to detecting the failure of the primary volume, the first tier being associated with a first media type that is slower than a second media type.

Example 13 includes the storage system of any of examples 8-12, wherein the storage controller is configured to store both the copy of the first heat map and the secondary heat prior to detecting the failure of the primary volume.

Example 14 includes the storage system of any of examples 8-13, wherein the storage controller is configured to retrieve the copy of the first heap map over a network after detecting failure of the primary volume.

Example 15 includes a computer program product comprising a computer readable storage medium having a computer readable program stored therein, wherein the computer readable program, when executed by a processor, causes the processor to: detect a failure of a primary volume at a first location, the primary volume having data stored on a first plurality of media according to a first heat map; in response to detecting the failure of the primary volume, overwrite a second heat map of a secondary volume at a second location with a copy of the first heat map, the secondary volume having data stored on a second plurality of media according to the second heat map; migrate data on the second plurality of media at the second location according to the copy of the first heat map; and process data access requests from the secondary location using the extents of data on the secondary plurality of media migrated according to the copy of the first heat map.

Example 16 includes the computer program product of example 15, wherein the first plurality of media includes one or more first storage drives of a first media type and one or more second storage drives of a second media type; wherein the second plurality of media includes one or more third storage drives of the first media type and one or more fourth storage drives of the second media type; wherein the first media type is relatively slower compared to the second media type.

Example 17 includes the computer program product of example 16, wherein the first media type is a hard disk drive having a rotational speed of 7,2000 revolutions per minute (RPM) and the second media type is a solid state drive.

Example 18 includes the computer program product of any of examples 15-17, wherein the computer readable program is further configured to cause the processor to migrate the data on the second plurality of media at the second location by comparing a respective current tier for at least one extent of data stored on the second plurality of media of the secondary volume with a respective tier for the at least one extent of data indicated by the copy of the first heat map; in response to determining that the respective current tier is different than the respective tier indicated by the copy of the first heat map, moving the at least one extent of data to the respective tier indicated by the copy of the first heat map prior to a next heat map cycle update.

Example 19 includes the computer program product of example 18, wherein the at least one extent of data includes only extents of data stored on a first tier of the secondary volume prior to detecting the failure of the primary volume, the first tier being associated with a first media type that is slower than a second media type.

Example 20 includes the computer program product of any of examples 15-19, wherein the computer readable program is further configured to cause the processor to store both the copy of the first heat map and the second heat map at the second location prior to detecting the failure of the primary volume.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
   detecting a failure of a primary volume at a first location, the primary volume having data stored on a first plurality of media according to a first heat map;
   in response to detecting the failure of the primary volume, overwriting a second heat map of a secondary volume at a second location with a copy of the first heat map, the secondary volume having data stored on a second plurality of media according to the second heat map;
   migrating extents of data on the second plurality of media at the second location according to the copy of the first heat map prior to a next heat map cycle update after detection of the failure; and
   processing data access requests from the secondary location using the extents of data on the secondary plurality of media migrated according to the copy of the first heat map.

2. The computer-implemented method of claim 1, wherein the first plurality of media includes one or more first storage drives of a first media type and one or more second storage drives of a second media type;
   wherein the second plurality of media includes one or more third storage drives of the first media type and one or more fourth storage drives of the second media type;
   wherein the first media type is relatively slower compared to the second media type.

3. The computer-implemented method of claim 2, wherein the first media type is a hard disk drive having a rotational speed of 7,200 revolutions per minute (RPM) and the second media type is a solid state drive.

4. The computer-implemented method of claim 1, wherein migrating the data on the second plurality of media at the second location comprises:
   comparing a respective current tier for at least one extent of data stored on the second plurality of media of the secondary volume with a respective tier for the at least one extent of data indicated by the copy of the first heat map;
   in response to determining that the respective current tier is different than the respective tier indicated by the copy of the first heat map, moving the at least one extent of data to the respective tier indicated by the copy of the first heat map prior to the next heat map cycle update.

5. The computer-implemented method of claim 4, wherein the at least one extent of data includes only extents of data stored on a first tier of the secondary volume prior to detecting the failure of the primary volume, the first tier being associated with a first media type that is slower than a second media type.

6. The computer-implemented method of claim 1, further comprising storing both the copy of the first heat map and the second heat map at the second location prior to detecting the failure of the primary volume.

7. The computer-implemented method of claim 1, further comprising retrieving the copy of the first heat map over a network after detecting failure of the primary volume.

8. A storage system comprising:
   a host adapter having one or more ports configured to communicatively couple the host adapter to one or more host devices;
   a storage controller comprising a processor and a memory, the storage controller communicatively coupled to the host adapter; and
   a device adapter comprising a processor and a memory, the device adapter communicatively coupled to the storage controller;
   wherein the device adapter further comprises a plurality of ports communicatively coupled to a plurality of storage drives grouped to form a plurality of storage tiers;
   wherein the storage controller is configured to:
   in response to detecting a failure of a primary volume physically located separate from the storage controller, overwrite a secondary heat map stored in the memory of the secondary controller with a copy of a first heat map utilized at the primary volume;
   migrate extents of data to one or more of the plurality of storage tiers according to the copy of the first heat map; and
   process data access requests using the extents of data migrated to the one or more of the plurality of storage tiers according to the copy of the first heat map.

9. The storage system of claim 8, wherein the plurality of storage drives includes one or more first storage drives of a first media type and one or more second storage drives of a second media type;
   wherein the first media type is relatively slower compared to the second media type.

10. The storage system of claim 9, wherein the first media type is a hard disk drive having a rotational speed of 7,200 revolutions per minute (RPM) and the second media type is a solid state drive.

11. The storage system of claim 8, wherein the storage controller is configured to migrate the extents of data to one or more of the plurality of storage tiers by:
   comparing a respective current tier for at least one extent of data stored on the plurality of storage drives with a respective tier for the at least one extent of data indicated by the copy of the first heat map; and
   in response to determining that the respective current tier is different than the respective tier indicated by the copy of the first heat map, moving the at least one extent of data to the respective tier indicated by the copy of the first heat map prior to a next heat map cycle update.

12. The storage system of claim 11, wherein the at least one extent of data includes only extents of data stored on a first tier prior to detecting the failure of the primary volume, the first tier being associated with a first media type that is slower than a second media type.

13. The storage system of claim 8, wherein the storage controller is configured to store both the copy of the first heat map and the secondary heat prior to detecting the failure of the primary volume.

14. The storage system of claim 8, wherein the storage controller is configured to retrieve the copy of the first heat map over a network after detecting failure of the primary volume.

15. A computer program product comprising a computer readable storage medium having a computer readable program stored therein, wherein the computer readable program, when executed by a processor, causes the processor to:
   detect a failure of a primary volume at a first location, the primary volume having data stored on a first plurality of media according to a first heat map;
   in response to detecting the failure of the primary volume, overwrite a second heat map of a secondary volume at a second location with a copy of the first heat map, the secondary volume having data stored on a second plurality of media according to the second heat map;
   migrate data on the second plurality of media at the second location according to the copy of the first heat map; and
   process data access requests from the secondary location using the extents of data on the secondary plurality of media migrated according to the copy of the first heat map.

16. The computer program product of claim 15, wherein the first plurality of media includes one or more first storage drives of a first media type and one or more second storage drives of a second media type;
   wherein the second plurality of media includes one or more third storage drives of the first media type and one or more fourth storage drives of the second media type;
   wherein the first media type is relatively slower compared to the second media type.

17. The computer program product of claim 16, wherein the first media type is a hard disk drive having a rotational speed of 7,200 revolutions per minute (RPM) and the second media type is a solid state drive.

18. The computer program product of claim 15, wherein the computer readable program is further configured to cause the processor to migrate the data on the second plurality of media at the second location by:
   comparing a respective current tier for at least one extent of data stored on the second plurality of media of the secondary volume with a respective tier for the at least one extent of data indicated by the copy of the first heat map;

in response to determining that the respective current tier is different than the respective tier indicated by the copy of the first heat map, moving the at least one extent of data to the respective tier indicated by the copy of the first heat map prior to a next heat map cycle update.

19. The computer program product of claim 18, wherein the at least one extent of data includes only extents of data stored on a first tier of the secondary volume prior to detecting the failure of the primary volume, the first tier being associated with a first media type that is slower than a second media type.

20. The computer program product of claim 15, wherein the computer readable program is further configured to cause the processor to store both the copy of the first heat map and the second heat map at the second location prior to detecting the failure of the primary volume.

* * * * *